(12) United States Patent
Faulks et al.

(10) Patent No.: US 10,709,123 B2
(45) Date of Patent: Jul. 14, 2020

(54) ELECTRONIC JIGGING DEVICE, SYSTEM AND METHOD

(71) Applicant: WIDOW MAKER OUTDOORS, LLC, Weyauwega, WI (US)

(72) Inventors: Jon Faulks, Fremont, WI (US); Kurt Duxbury, Weyauwega, WI (US); Keith Ziemba, Belleville, WI (US)

( * ) Notice: Subject to any disclaimer, the term of this patent is extended or adjusted under 35 U.S.C. 154(b) by 625 days.

(21) Appl. No.: 14/865,175

(22) Filed: Sep. 25, 2015

(65) Prior Publication Data

US 2017/0086438 A1 Mar. 30, 2017

(51) Int. Cl.
*A01K 91/06* (2006.01)
*G06F 3/0354* (2013.01)

(52) U.S. Cl.
CPC ........ *A01K 91/065* (2013.01); *G06F 3/03547* (2013.01)

(58) Field of Classification Search
CPC ........ A01K 97/01; A01K 97/12; A01K 97/10; A01K 97/11; A01K 97/125; A01K 91/065
USPC ...................................... 43/17, 4.5, 21.2, 15
See application file for complete search history.

(56) References Cited

U.S. PATENT DOCUMENTS

| | | | |
|---|---|---|---|
| 4,752,878 A * | 6/1988 | Sigurdsson .......... | A01K 89/017 43/15 |
| 4,993,181 A * | 2/1991 | Cooper .................. | A01K 97/01 43/15 |
| 5,084,995 A * | 2/1992 | Beaudoin ............. | A01K 91/065 43/19.2 |
| 9,179,657 B1 * | 11/2015 | Winter .................. | A01K 91/065 |
| 2007/0011937 A1 * | 1/2007 | Roh ....................... | A01K 97/10 43/19.2 |
| 2015/0223440 A1 * | 8/2015 | Schmaus ................ | A01K 97/10 43/4.5 |

* cited by examiner

*Primary Examiner* — Peter M Poon
*Assistant Examiner* — Jeffrey R Larsen
(74) *Attorney, Agent, or Firm* — Joseph S. Heino; Erin E. Kaprelian

(57) ABSTRACT

An electronic jigging device is used with a fishing rod, reel, line and lure, which device is user-programmable to provide a wide range of electronically-generated jigging functionality and to electronically detect the optimum moment to signal electronic release of the fishing rod so as to set a hook that is used within or near the lure. The device, system and method of the present invention allows for user-programmable specific jigging and hook-setting options.

18 Claims, 5 Drawing Sheets

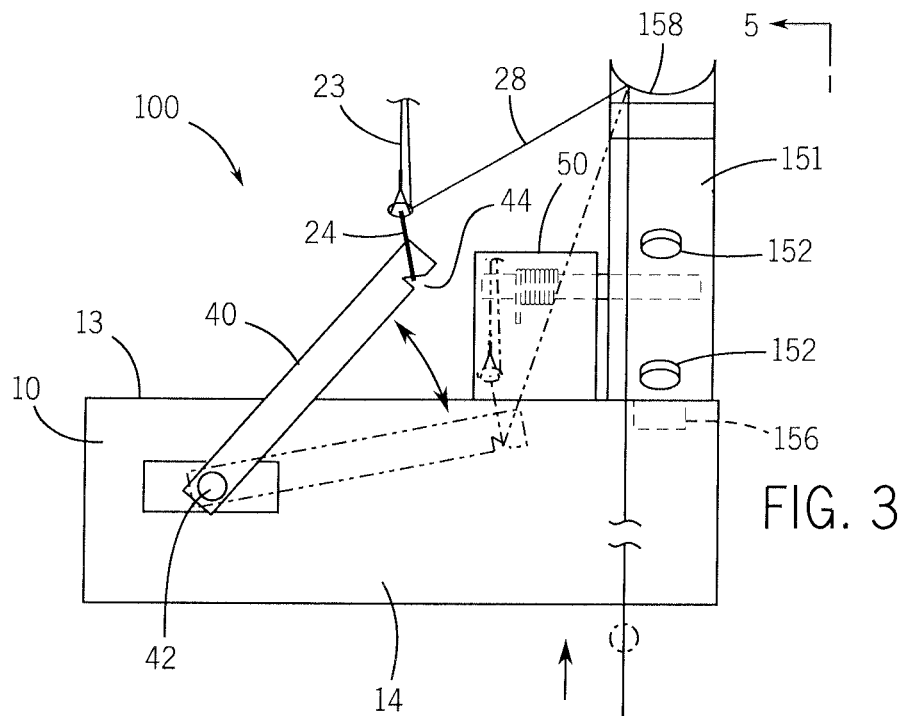
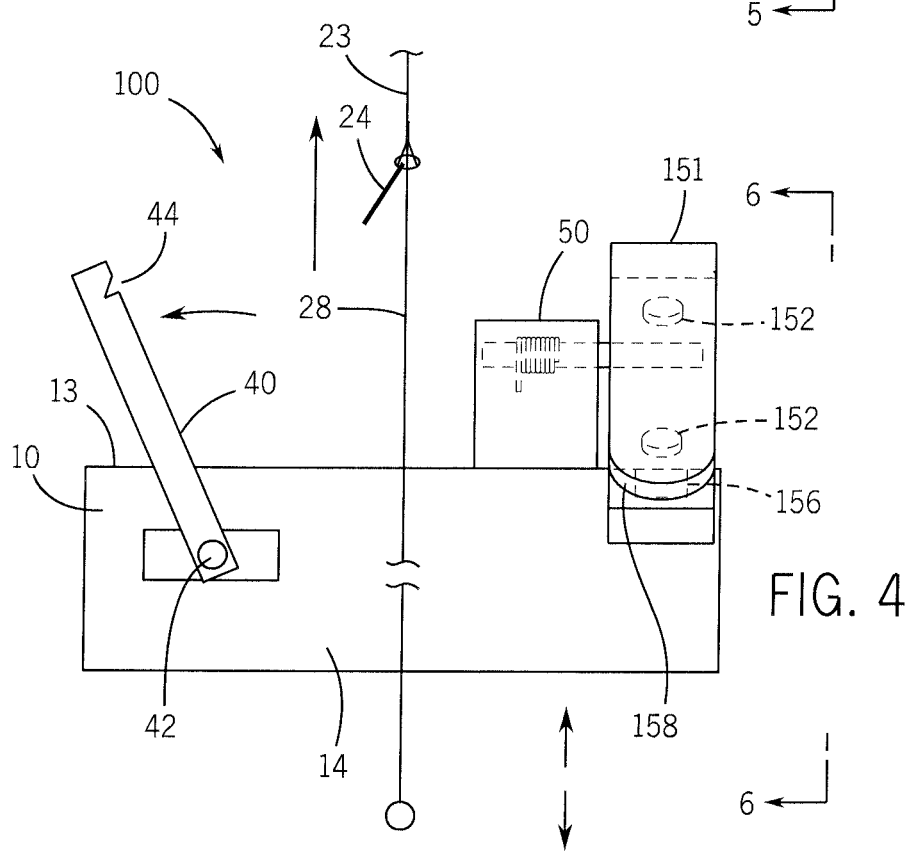

ELECTRONIC JIGGING DEVICE, SYSTEM AND METHOD

FIELD OF THE INVENTION

This invention relates generally to items and accessories used in the sport of fishing. More particularly, it relates to an electronic jigging device that is used with a fishing rod, reel, line and lure, which device is user-programmable to provide a wide range of electronically-generated jigging functionality and to electronically detect the optimum moment to signal electronic release of the fishing rod so as to set a hook that is used within or near the lure. In short, the device, system and method of the present invention allows for user-programmable specific jigging and hook-setting options.

BACKGROUND OF THE INVENTION

Fishing has evolved from being a means of human survival in ancient times to being a competitive and recreational sport in modern times. Accordingly, modern anglers spend substantial amounts of time conducting their outdoor fishing expeditions using a wide variety of gadgets that can be used with conventional fishing rods, reels, lines and lures, all in an effort to catch fish.

One particular area that has evolved in the sport of fishing is the mechanical replication of the angler's manual "playing" of the fishing rod, reel, line and lure. That is, certain mechanical devices have been devised and are used for the purpose of moving the rod and reel in such a way that such playing is replicated. For example, other jigging devices tend to move the entire rod and reel via a full rotational direct current ("DC") motor having a shaft and cams disposed about the shaft to apply jigging action to the lure. Hook setting mechanisms tend to use a mechanical pressure trigger that is attached to the rod to "set" the hook. That is, once the mechanical trigger is activated, the rod sets the hook.

However, using rotational jigging methods tend to set a repetitive jigging motion. Devices using this method do not allow the user to move a lure a specific distance, at a specific time, or to create delays in the movement. Automatic hook setting devices typically set the hook by releasing a rod that is stressed by bending via a mechanical trigger. Once a set amount of force is reached, the device will allow the rod to set the hook. But balancing the needed force to trigger the device can be a challenge. This is because the delay time between the detection of force on the line and the release of the rod via triggering may not be optimized.

In the view of these inventors, there is a need for an improved electronic jigging device and method. The improved electronic jigging device and method of the present invention meets this need.

SUMMARY OF THE INVENTION

The present invention uses a preprogrammed microcontroller within the device to control a servo motor which allows the user to program the desired jigging action the user wants into the device. It is to be noted that the use of a servo motor, which can be either a linear actuator or a rotary actuator, is preferred because it allows for precise control of linear or angular positioning, although stepper motors or other motors could be used. Such other motors, however, are limited in performance due to a lack of feedback which is provided via the control element of the servo motor. This allows for random movements and delays to be applied to the fishing lure. The invention uses sensors to detect the movement of a triggering device. The microcontroller detects the movement of the trigger and can signal the servo motor to release the rod at the preprogrammed time. This keeps the triggering apparatus independent from the rod pressure and rod release independent from the triggering mechanism. Further, the microcontroller and servo control the device's functions. It uses a servo motor attached to the fishing rod tip or line which allows the user to program the lure's jigging motion and then release of the rod for hook setting. Random motion and delays can now be applied to the fishing lure in accordance with a pre-programmed scheme. The program can be changed at any time by the user accessing a keypad on the unit, or by accessing a transceiver via a remote computing device, such as a mobile phone or the like. The servo motor is independent of the triggering arm removing the rod pressure from the trigger.

The user can also program when the user would like to release the rod to set the hook based on sensor input. It is to be understood that the force of the bent over rod is independent from the force on the lure and the trigger arm. Hook setting can be triggered at a certain pressure, distance moved, or time delay. If one sensor detects movement, it can change the program to incite a non-aggressive fish into taking the lure. Then, a second sensor can detect when the fish is moving the lure and the microcontroller can signal electronic release of the fishing rod to set the hook. Both sensors use Hall effect principles to sense a current change, which is detected via Hall effect sensors and magnets on a balance arm, for example. This change results in an electrical signal being sent to the microcontroller which then moves the servo arm to a position that releases the tip of the fishing rod. This allows the fishing rod tip to spring upwardly, thereby applying pressure on the lure via the fishing line. At the same time, the microcontroller sends an electromagnetic wave signal to the remote computing device via the transceiver to notify the user that a fish strike and a setting of the lure hook has been made.

The foregoing and other features of the present invention will be apparent from the detailed description that follows.

BRIEF DESCRIPTION OF THE DRAWINGS

FIG. 3 is a partial front elevational view of a portion of a second embodiment of the device and showing the device, a portion of the rod and line in a pre-strike or pre-trigger position.

FIG. 4 is a view similar to that of FIG. 3 but showing the device, rod portion and line portion in a post-strike or post-triggered position.

DETAILED DESCRIPTION

Figure 1:
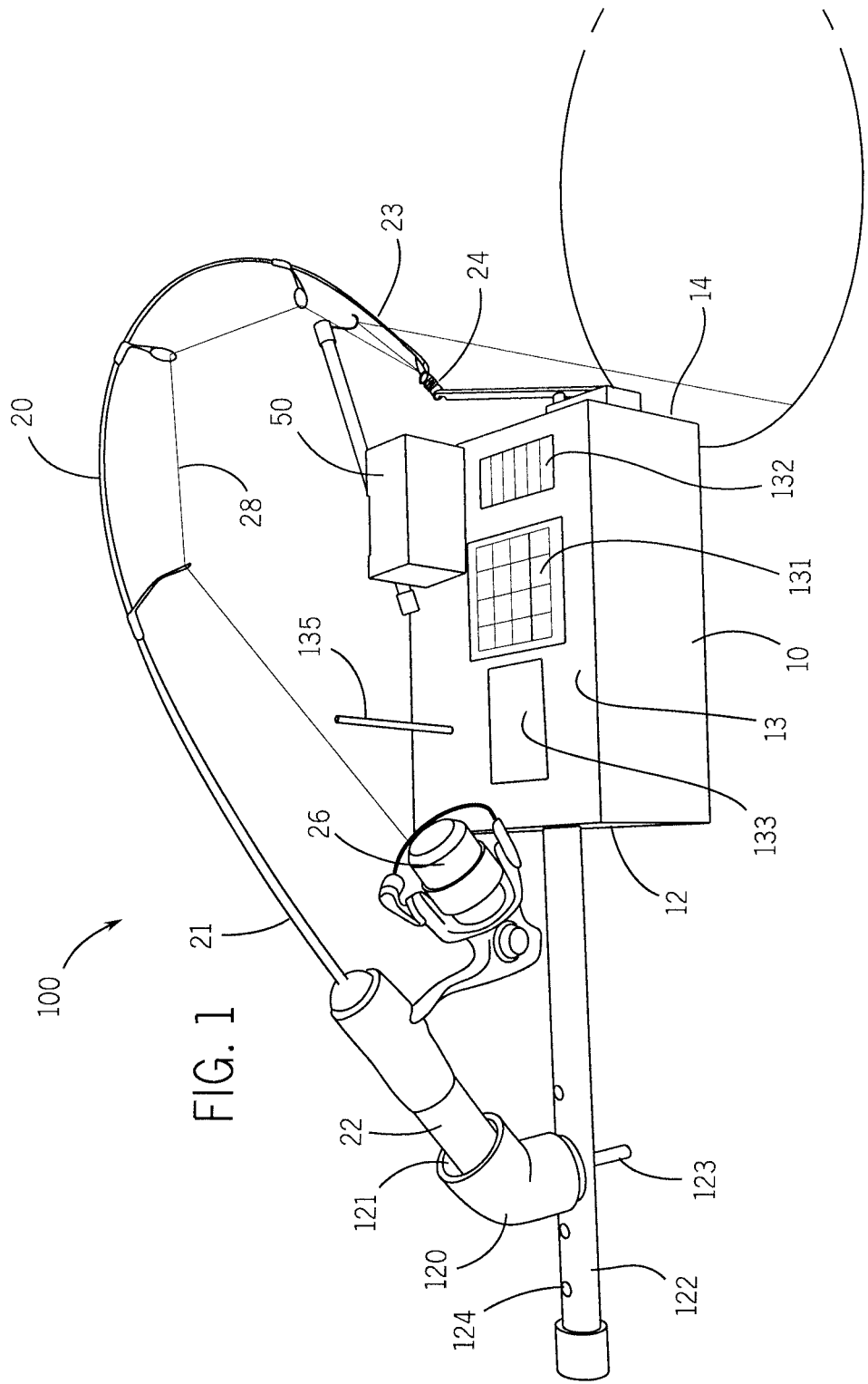
FIG. 1 is top and left side perspective view of a first embodiment of the electronic jigging device that is constructed in accordance with the present invention and showing the device, rod and line in a pre-strike or pre-trigger position.

Referring now to the drawings in detail wherein like numbers represent like elements throughout, FIG. 1 illustrates a perspective view of one embodiment of the electronic jigging device, generally identified (100), constructed in accordance with the present invention. As shown, the device (100) is used with a fishing rod (20), fishing reel (26), fishing line (28) and fishing lure (27). The fishing rod (20) further comprises a handle (22) disposed at a proximal end (21) of the rod (20) and a tip and line guide (25) at a distal end (23).

A sealed, but accessible, housing (10) is provided, which housing (10) comprises a closed container having a box shape structure with a front end (14), a back end (12) and a top surface (13). The handle (22) of the fishing rod (20) is placed within a rod holder (120) that extends rearwardly from the back end (12) of the housing (10). Specifically, the rod holder (120) comprises a receiving aperture (121) which is intended to hold a substantial portion of the rod handle (22) within it. In the preferred embodiment, the rod holder (120) further comprises a substantially vertical and downwardly-extending positioning post (123). The post (123) is received within any one of several apertures (124) that are disposed along the top surface of a rearwardly-extending tubular support (122). This variable-positioning structure allows for use of the device (100) with a wide variety of fishing rods (20). However, it is to be appreciated by those skilled in the art that the tubular support (122) and rod holder (120) structures could be configured from other structures that accomplish the same functionality, which is to receive and to hold the rod handle (22) in a fixed position behind the housing (10) during use of the assembly (100).

Figure 7:
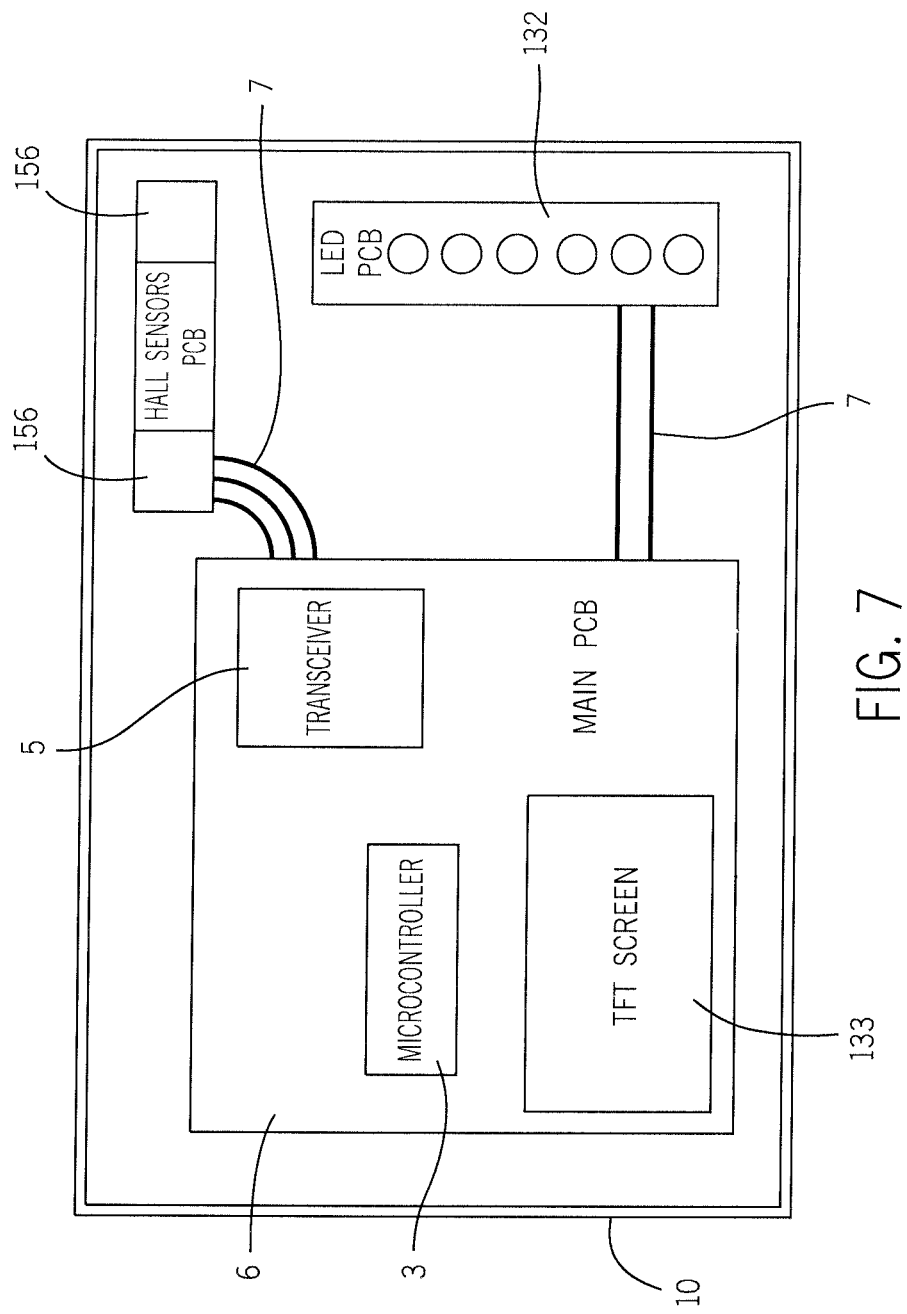
FIG. 7 is a schematic diagram of the internal control elements of the present invention.

Disposed on the top surface (13) of the housing (10) is a thin-film-transistor (or "TFT") touch keypad (131), a digital display (133), an array of light-emitting diodes (or "LED") (132), a transceiver antenna (135), a trigger arm subassembly (50), the trigger arm subassembly (50) comprising a trigger arm (151), and Hall effect sensors (156). Disposed within the housing (10) is a battery (not shown), or other power supply, a microcontroller (3), a servo motor (4), a transceiver (5) and a circuit board (6). In some examples, the servo motor (4) may be extend to be partially external with respect to the housing (10). See FIG. 7. Power is supplied to the device (100) by the battery via an off/on power switch (also not shown). All internal elements are interconnected via wiring or conductive tracks (7) that are etched onto the circuit board (6). The microcontroller (3) controls the servo motor (4), the trigger arm subassembly (50), the display (133), the transceiver (5), the keypad (131) and the LEDs (132). Most significantly, the microcontroller (3) runs a program that moves the servo motor (4) and a servo arm (40). The servo arm (40) is rotatably movable by the servo motor (4) about a pivot point (42). The servo arm (40) further comprises a hold and release notch (44) that is adapted to move the tip or distal end (23) of the fishing pole (20) and line (28) in accordance with a pre-programmed jigging motion as may be desired or required by the user. In one embodiment, movement of the servo arm (40) results in movement of the fishing rod tip (23) because it is attached to a fishing rod attachment hook (24). In this structure, any movement of the servo arm (40) is then applied to the fishing line (28) and fishing lure (27). It is also to be noted that a portion of the fishing line (28) is then attached to the line holder (158), which is part of the trigger arm subassembly (50). See FIGS. 1 and 3.

In application, and when a fish moves the fishing lure (27), the line (28) applies pressure to the trigger arm (151). This moves the trigger arm (151). Magnets (152) in the trigger arm (151) move further or closer to the Hall effect sensors (156). The microcontroller (3) senses a current change from the Hall effect sensors (156) via the electronics that are part of the circuit board (6). This change in electrical current triggers an interrupt in the program and moves the servo motor (4) to a "release position. This moves the servo arm (40) to a position that releases the fishing rod attachment hook (24) from the servo arm (40). This springs the fishing rod tip (23) up thereby applying pressure on the fish lure through the fishing line (28). The microcontroller (3) also sends out a wireless signal to a remote device via the transceiver (5) and the transceiver antenna (135). This notifies the user of a "triggered" event and the user can reel in the fish with the fishing rod (20) and its reel (28). See FIG. 7.

As alluded to above, the device (100) of the present invention works by creating a pre-programmed scheme (or "pattern") that is loaded into the microcontroller (3) by the user via the TFT keypad (131), or even from the keypad (not shown) of the remote device (also not shown), prior to use of the device (100). This program tells the microcontroller (3) to send electrical signals to the servo motor (4). A change in the electrical signal moves the servo motor (4) and the servo arm (40) to certain positions. That is, the program makes changes to the electrical signal "pattern" thus moving the servo motor (4) and the servo arm (40) to different positions, thereby creating the pattern desired or required by the user. More specifically, the microcontroller (3) changes the direction, speed, and allows pauses of the servo motor (4) based on the program. In this way, a user can create a custom program by entering in numbers, via the onboard TFT key pad (131) or wirelessly via the remote device (110), either of which will make the programming changes that move the servo motor (4) and servo arm (40). This allows the user to create virtually an infinite variety of jigging patterns.

Attaching the fishing rod attachment hook (24) to the distal tip (23) of the fishing rod (20) will move the rod tip (23) according to the movement of the servo motor (4), thus moving the lure in like fashion. The program is made up of entered data which can be transferred between two transceivers (5), which allows wireless data transfer from one microcontroller (3) to another. That is, data entered into the remote device can be transmitted via transceiver and received by the transceiver (5) of the device (100). Once the data is received, the data will be entered which will change the electrical signals in accordance with the program.

The trigger arm (151) contains magnets (152), a line holder (158) and a weight (154). The trigger arm (151) is held by a trigger arm holder (153) which allows the arm (151) to pivot. See FIG. 3. The weight (156) can be changed or moved on the trigger arm (151) to balance out the weight of the line (28) and lure on the opposite end. This allows the user to change the balance of the trigger arm (151) which changes the amount of force needed to rotate the trigger arm (151). As a fish bites the lure and swims off, the line (28) is pulled. In turn, this pulls the trigger arm (151) down on the side with the line holder (158). This also moves a magnet (152) affixed to the trigger arm (151) up and another magnet (152) down, away from and towards the Hall effect sensors (156), respectively. These Hall effect sensors (156) sense the change in magnetic force created by such movement, which translates to a fluctuating change in current to the microcontroller (3). Once the trigger arm holder (153) reaches its pre-set detection point, in accordance with the pre-programmed scheme, it changes the amount of current allowed to pass through and to the microcontroller (3). The microcontroller (3) senses the current change and triggers an interrupt in the program.

Figure 2:
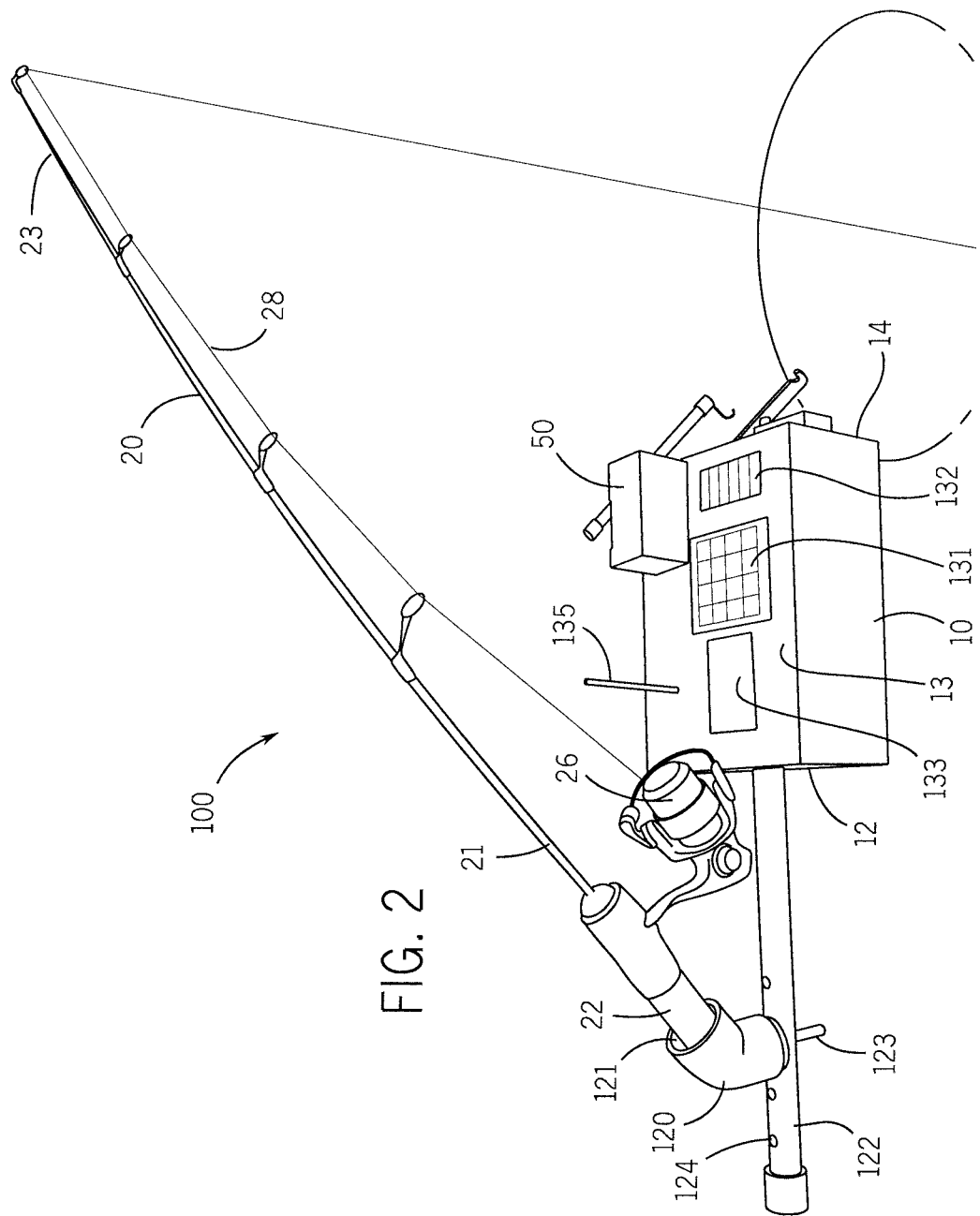
FIG. 2 is a view similar to that of FIG. 1 but showing the device, rod and line in a post-strike or post-triggered position.
Figure 5:
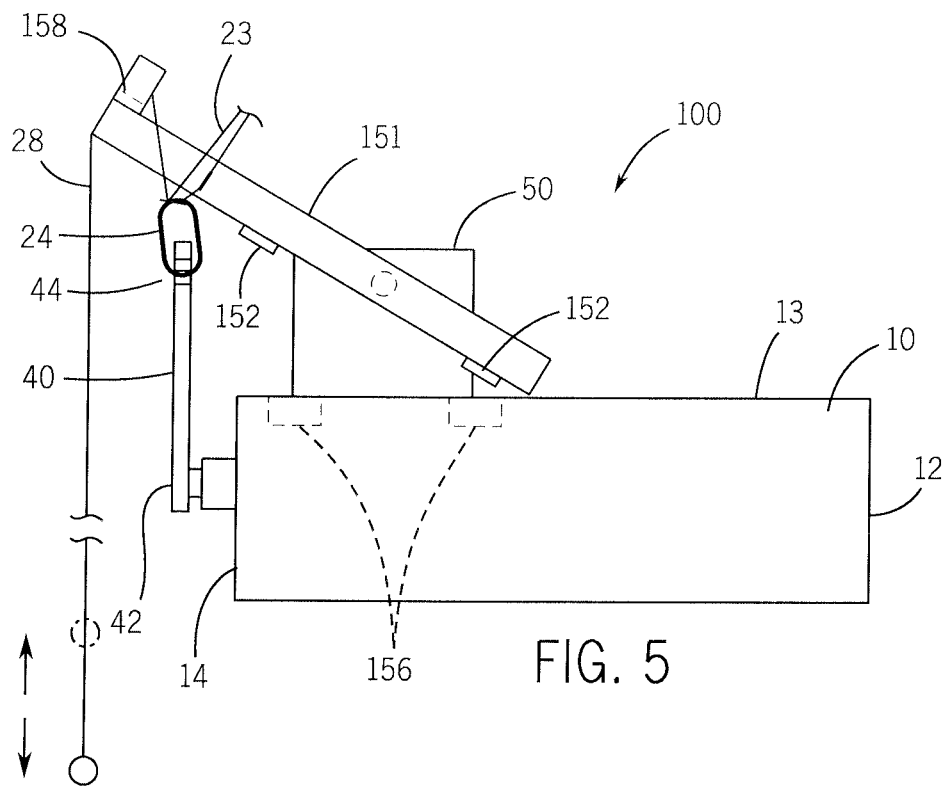
FIG. 5 is a partial right side elevational view showing the portion of the second embodiment illustrated in FIG. 3.
Figure 6:
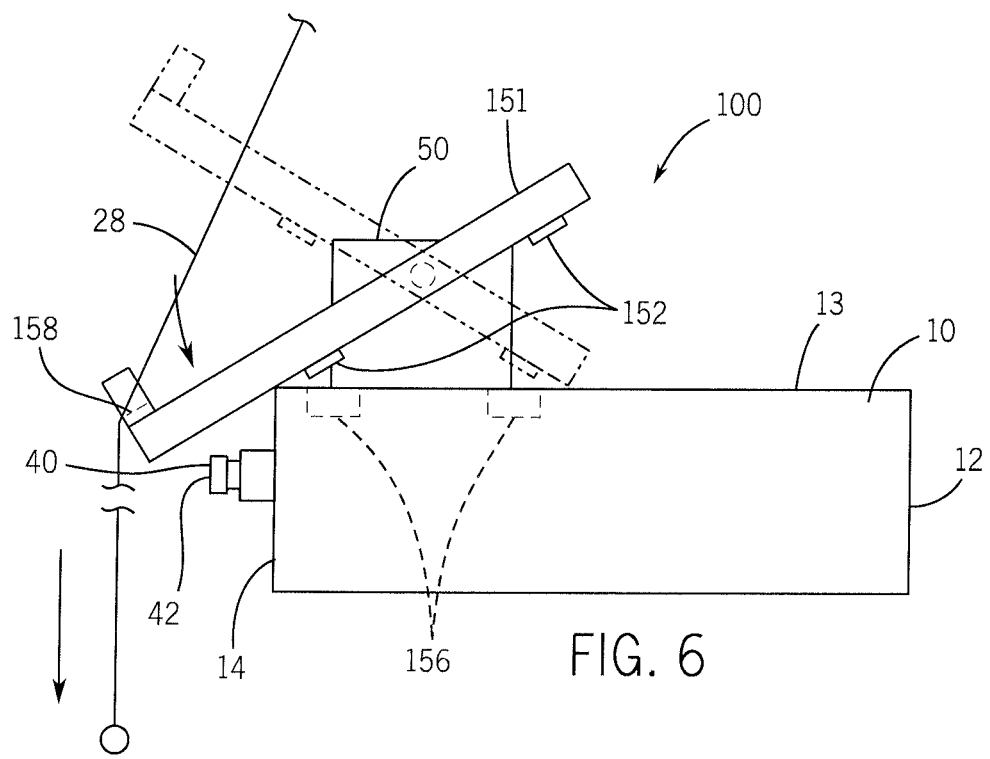
FIG. 6 is a partial right side elevational view showing the portion of the second embodiment illustrated in FIG. 4.

At this point, this new section of program can move the servo motor (4) to a new jigging pattern to entice the fish to take the lure, or move the attachment arm (8) to the release position at a certain time. At this position, the rod tip (23) is released from the servo attachment arm (40). The upward force of the released rod tip (23) sets the hook into the fish. See FIG. 2. The transceiver (5) will then send out alarm data via a wireless signal from the antenna (135) to another transceiver thereby sounding an alarm on the remote computing device.

Although the device (100) is disclosed and described herein as being used with a rod (20) of the type that is typically used for ice fishing, such is not a limitation of the present invention.

The principles of this invention having been fully explained in connection with the foregoing, we hereby claim as our invention:

1. An electronic jigging device, comprising:
   a housing;
   a power supply;
   a microcontroller disposed within the housing to control operation of the electronic jigging device in accordance with a pre-programmed scheme;
   a servo motor coupled to the microcontroller and disposed within the housing;
   a servo arm coupled to the servo motor and operated by the servo motor;
   a plurality of Hall effect sensors coupled to the microcontroller to:
      detect a change in current;
      determine that a trigger arm holder has reached a pre-set detection point, wherein the pre-set detection point corresponds to the pre-programmed scheme; and
      transmit a message to the microcontroller to move the servo arm to a release position in response to the determination that the trigger arm holder has reached the pre-set detection point; and
   a trigger arm subassembly comprising:
      the plurality of Hall effect sensors; and
      a trigger arm, wherein:
         the trigger arm moves in response to an application of pressure; and
         magnets contained within the trigger arm move with respect to the plurality of Hall effect sensors in response to the movement of the trigger arm.

2. The electronic jigging device of claim 1, wherein:
   the housing comprises a fishing pole holder;
   the servo arm comprises a fishing rod attachment hook; and
   the trigger arm comprises a line holder.

3. The electronic jigging device of claim 2, wherein the housing further comprises:
   a key pad to program the microcontroller;
   a display coupled to the keypad; and
   a transceiver coupled to the display and the microcontroller.

4. The electronic jigging device of claim 2 wherein the housing further comprises:
   a key pad;
   a display coupled to the key pad; and
   a transceiver coupled to the display and the microcontroller, wherein the transceiver is to receive instructions to program the microcontroller from a remote computing device.

5. The electronic jigging device of claim 2, wherein:
   the device is used with a fishing rod comprising fishing line and a lure coupled to the fishing line; and
   the servo motor actuates the servo arm; and
   the actuated servo arm jigs the fishing line with respect to the fishing rod.

6. The electronic jigging device of claim 2, wherein:
   the device is coupled to a fishing rod, wherein the fishing rod further comprises:
      fishing line coupled to the trigger arm by the line holder; and
      a fishing rod tip; and
   the line holder actuates to set a hook.

7. An electronic jigging system, comprising:
   a fishing pole comprising a fishing line and a fishing lure;
   a housing, the housing comprising a fishing pole holder;
   a power supply;
   a microcontroller disposed within the housing to control operation of the system in accord with a pre-programmed scheme;
   a servo motor coupled to the microcontroller;
   a servo arm coupled to the servo motor;
   a plurality of Hall effect sensors coupled to the microcontroller to:
      detect a change in current;
      determine that a predetermined time delay has occurred since the detection of the change in current at the plurality of Hall effect sensors; and
      transmit a message to the microcontroller to cause the microcontroller to move the servo arm to a release position in response to the determination that the predetermined time delay has occurred; and
   a trigger arm coupled to the plurality of Hall effect sensors, wherein:
      the trigger arm includes a plurality of magnets;
      the plurality of magnets move with respect to the plurality of Hall effect sensors when pressure is applied to the trigger arm
      the trigger arm is released when the plurality of Hall effect sensors transmits the servo arm to the release position in response to the determination that the predetermined time delay has occurred.

8. The electronic jigging system of claim 7, wherein:
   the servo arm comprises a fishing rod attachment hook; and
   the trigger arm comprises a line holder.

9. The electronic jigging system of claim 8, wherein the housing further comprises:
   a key pad to program the microcontroller;
   a display coupled to the key pad; and
   a transceiver coupled to the display.

10. The electronic jigging system of claim 8 wherein the housing further comprises:
    a key pad;
    a display coupled to the key pad; and
    a transceiver coupled to the display and the microcontroller, wherein the transceiver is to receive instructions to program the microcontroller from a remote computing device.

11. The electronic jigging system of claim 8, wherein:
    the servo motor actuates the servo arm; and
    the actuated servo arm jigs the fishing line.

12. The electronic jigging system of claim 8, wherein hook setting movement is actuated by the line holder.

13. An electronic jigging method, comprising
    moving a servo motor disposed within a housing, wherein the servo motor is moved by a programmed microcontroller;

rotating a servo arm about a pivot point, wherein:
  rotating the servo arm actuates a fishing line coupled to the servo arm and a fishing lure coupled to the fishing line; and
  the servo arm is rotated by the servo motor in accordance with the programmed microcontroller;
in response to an application of pressure to the fishing lure, applying pressure to a trigger arm, wherein:
  the trigger arm is coupled to the fishing line; and
  the fishing line applies the pressure to the trigger arm;
determining a first change in an amount of current at a first Hall effect sensor, wherein the first current changes in response to a first amount of movement of magnets resulting from the application of pressure to the trigger arm;
altering a pattern of movement of rotation of the servo arm in response to the determination that the first amount of current at the first Hall effect sensor has changed;
determining, at a second Hall effect sensor, a second change in an amount of current, wherein the current changes in response to a second amount of movement of magnets;
triggering an interrupt in the programmed microcontroller, wherein the interrupt is triggered by the determination of the second change in an amount of current at the second Hall effect sensor;
moving, by the microcontroller, the servo arm to a release position in response to the triggered interrupt; and
releasing a fishing rod attachment hook from the servo arm in response to the movement of the servo arm to the release position.

14. The electronic jigging method of claim 13, wherein:
the servo arm includes the fishing rod attachment hook; and
the trigger arm includes a line holder.

15. The electronic jigging method of claim 13, wherein the housing further comprises:
a key pad;
a display coupled to the key pad; and
a transceiver coupled to the key pad and the display.

16. The electronic jigging method of claim 15, further comprising programming the microcontroller by the key pad.

17. The electronic jigging method of claim 16, further comprising programming the microcontroller by the transceiver coupled to the key pad and the microcontroller, wherein the transceiver receives instructions to program the microcontroller from the key pad.

18. The electronic jigging method of claim 16, further comprising programming the microcontroller by the transceiver coupled to the microcontroller, wherein the transceiver receives instructions to program the microcontroller from an input at a remote computing device.

* * * * *